United States Patent Office 3,124,332
Patented Mar. 10, 1964

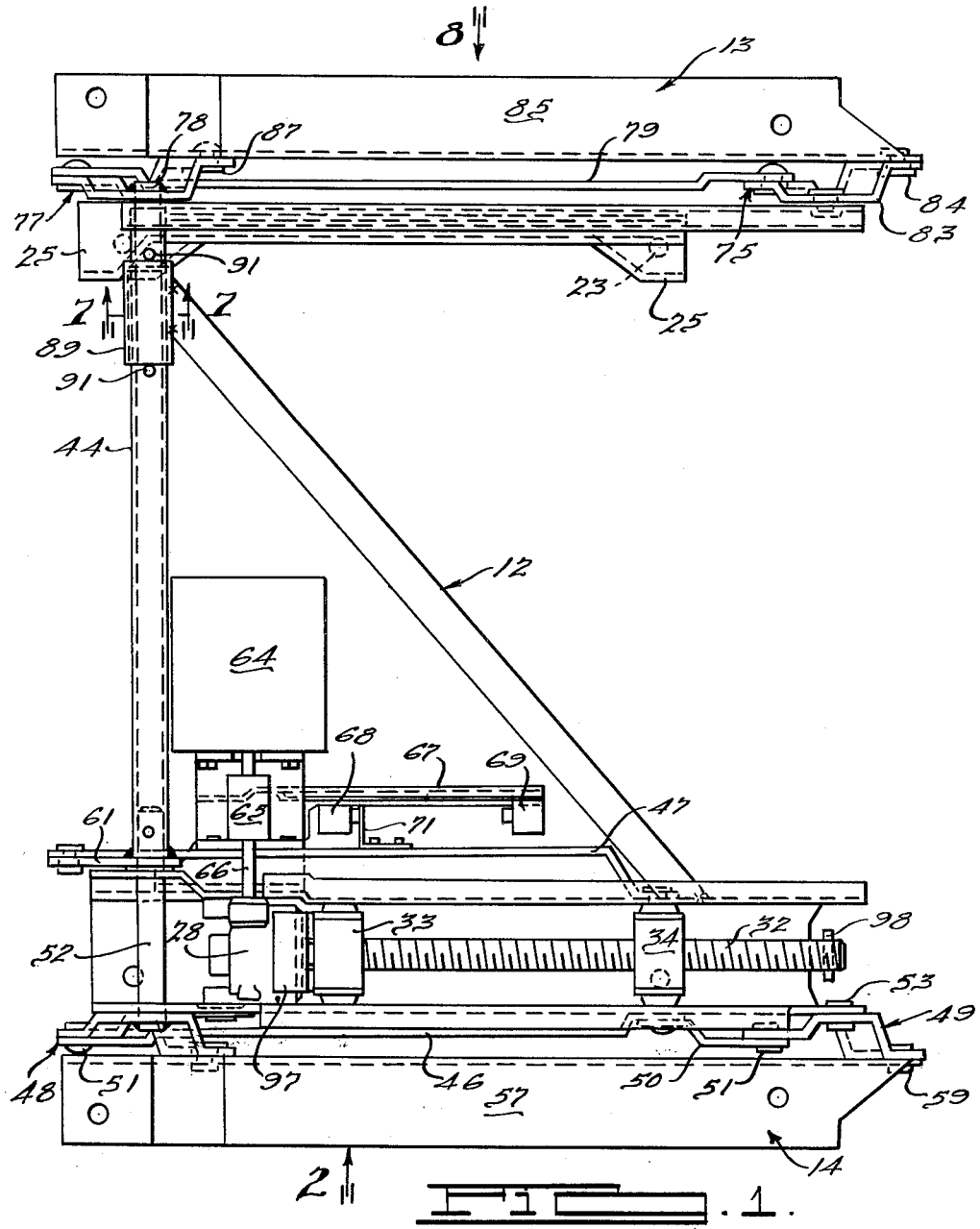

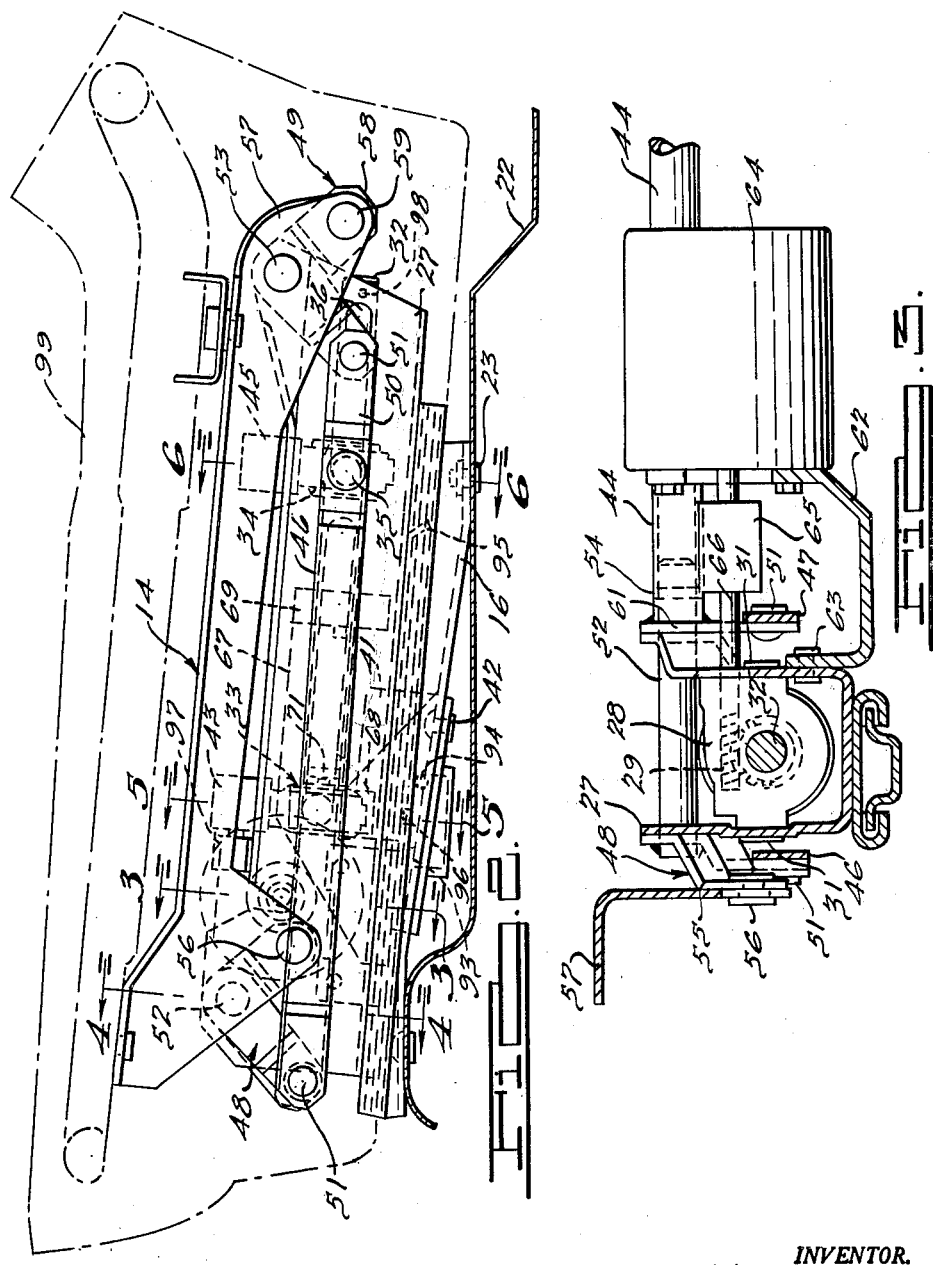

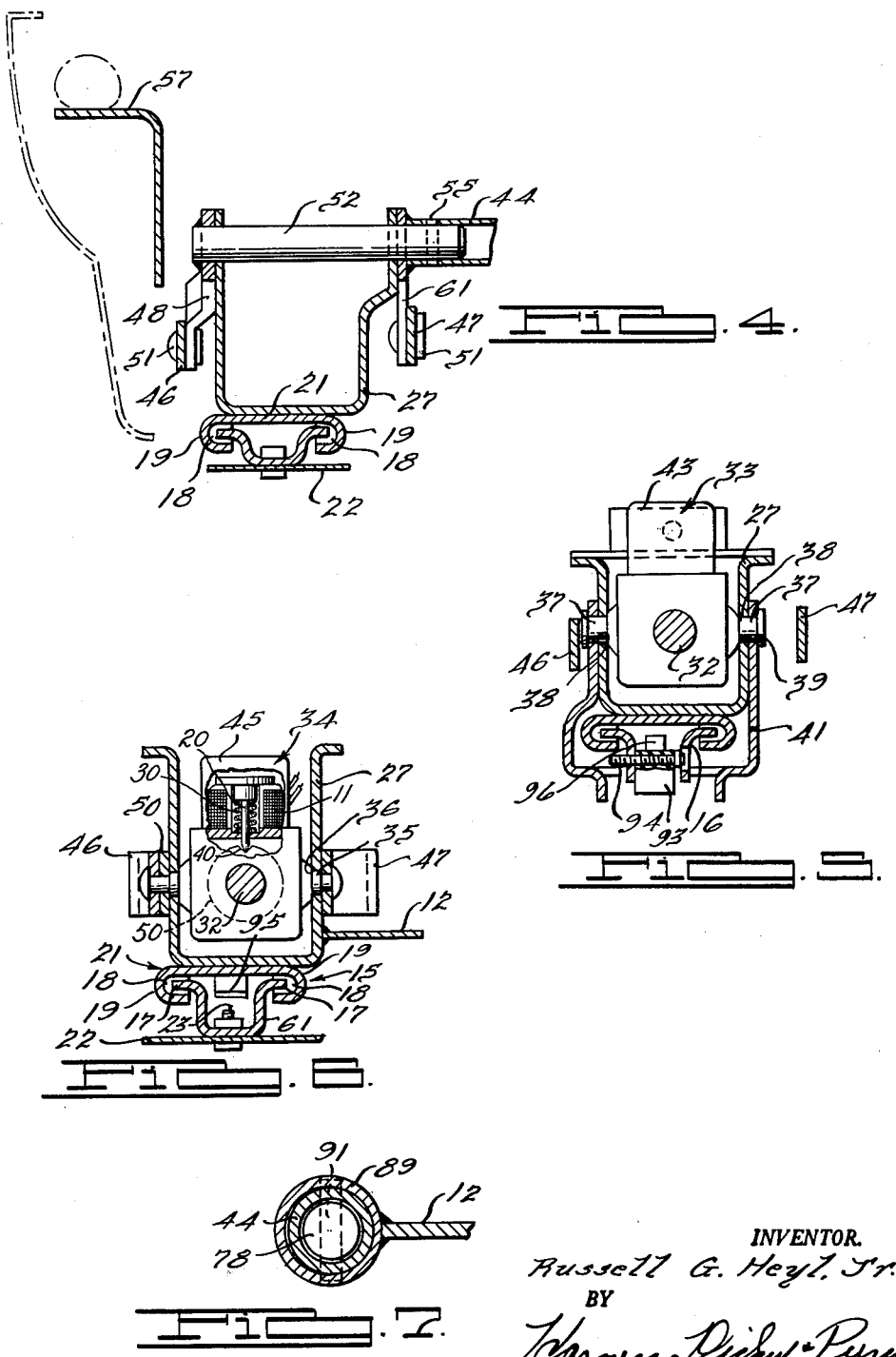

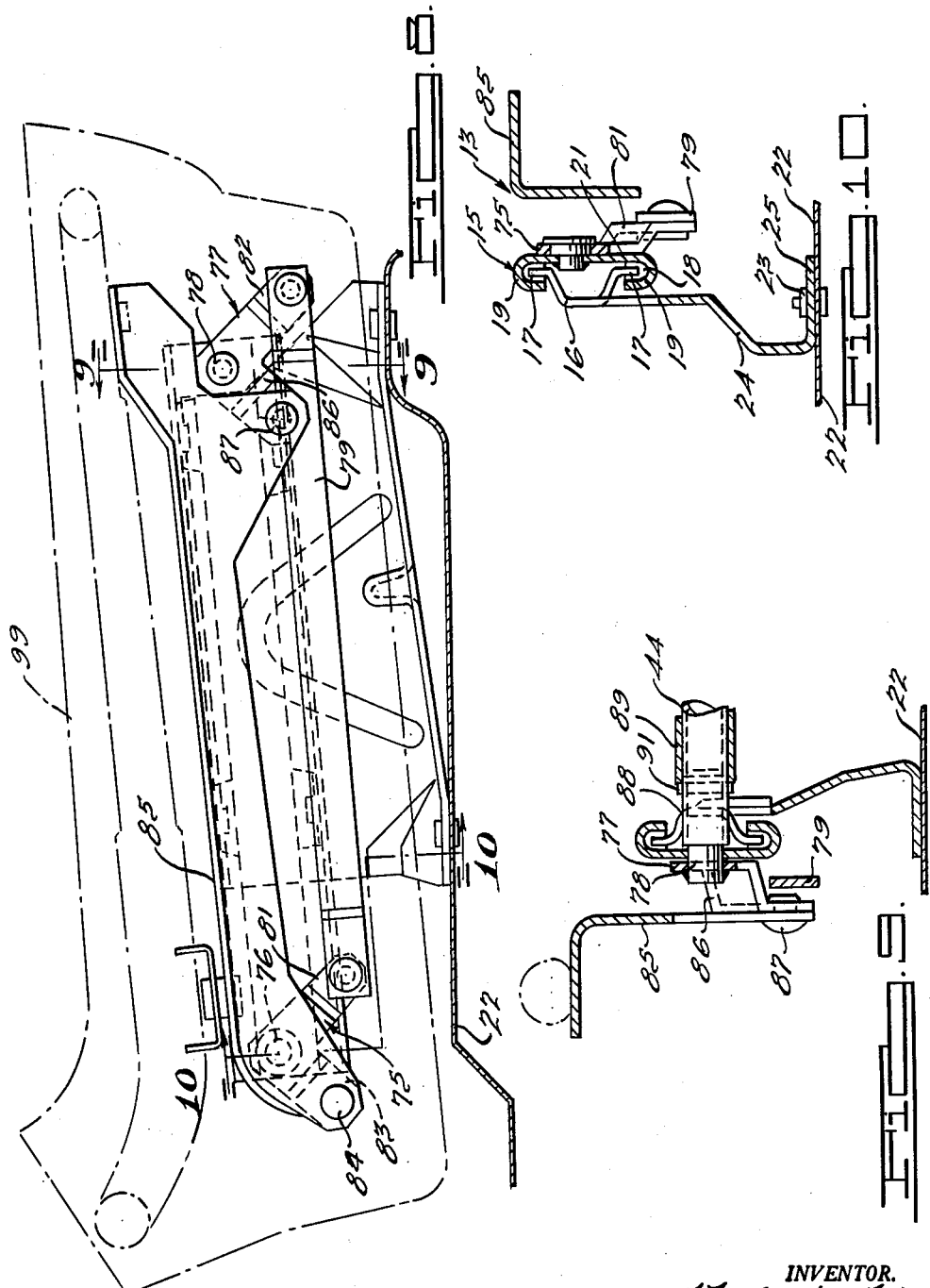

3,124,332
SEAT TRACK
Russell G. Heyl, Jr., Birmingham, Mich., assignor to American Metal Products Company, Detroit, Mich., a corporation of Michigan
Filed Sept. 9, 1960, Ser. No. 54,973
20 Claims. (Cl. 248—420)

This invention relates to seat supporting mechanisms, and particularly to a seat supporting mechanism having spaced track elements containing like forwardly and rearwardly movable slides, one disposed vertically and the other horizontally and interconnected by a torsion bar that is driven in rotation and braced from the side having the horizontally disposed slide.

The spaced track elements each have a floor engaging member which supports the slides in the horizontal and vertical positions. The track element having the slide disposed in a horizontal position carries an upward presented channel member containing a pair of solenoid actuated nuts mounted on a lead screw and driven by a worm and worm wheel from a reversible motor disposed laterally from the channel member. Interconnected bell cranks are pivoted to the channel member and to one of the nuts in a manner to operate the bell cranks and move a seat supporting element upwardly or downwardly to raise and lower the supported side of the seat. The other nut is fixed to the support when its solenoid is energized so that the screw will move axially therethrough and carry the slide and channel member therewith to advance or retract the supported side of the seat. At the forward end of the frame, the bell crank is connected to a pivoted stub shaft which is joined to a torsion bar connected across to the other track element and pivoted to an arm of the forward of a pair of bell cranks which are pivoted to the vertically disposed slide thereof. The bell cranks are interconnected to cause the seat supporting element, on the second track, to be raised and lowered in timed relation with the movement of the seat supporting element on the first said track. A sleeve is mounted upon the torsion bar and interconnected by an angularly disposed brace to the rear end of the channel-shaped member for bracing the end of the torsion bar which is adjacent to the second track element. This causes the slide on the second track element to advance and retract in the horizonal plane along with the slide on the first said track element. The channel member carries a pair of aligned switches between which a finger projects in position to be engaged by either switch to interrupt the horizontal movement of the seat in either direction of movement.

Accordingly, the main objects of the invention are: to provide a track mechanism for adjusting a seat horizontally and vertically with spaced supports having like slides, the one on the one support being disposed in a horizontal plane and the one on the other support being disposed in a vertical plane; to support a lead screw having a pair of running nuts on a horizontally disposed slide with means by which the energization of the solenoids will cause the movable portion of the mechanism to be advanced, retracted, raised and/or lowered, the movement of the frame on one support being transferred by a torsion bar to the support at the opposite side of the mechanism; to interconnect a pair of spaced supporting tracks for a seat with a torsion bar for operating similar elements on both tracks simultaneously braced by a diagonal element carried by one track and extending to one end of the torsion bar on the other track; and, in general, to provide a seat supporting mechanism which is simple in construction, positive in operation, and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a plan view of a seat supporting track embodying features of the present invention;

FIG. 2 is an end view of the structure illustrated in FIG. 1, as viewed from the side 2 thereof;

FIG. 3 is a sectional view of the structure illustrated in FIG. 2, taken on the line 3—3 thereof;

FIG. 4 is a sectional view of the structure illustrated in FIG. 2, taken on the line 4—4 thereof;

FIG. 5 is a sectional view of the structure illustrated in FIG. 2, taken on the line 5—5 thereof;

FIG. 6 is a sectional view of the structure illustrated in FIG. 2, taken on the line 6—6 thereof;

FIG. 7 is an enlarged broken sectional view of the structure illustrated in FIG. 1, taken on the line 7—7 thereof;

FIG. 8 is an end view of the structure illustrated in FIG. 1, as viewed from the side 8 thereof;

FIG. 9 is a sectional view of the structure illustrated in FIG. 8, taken on the line 9—9 thereof; and FIG. 10 is a view of the structure illustrated in FIG. 8, taken on the line 10—10 thereof.

The seat supporting and adjusting mechanism of the present invention comprises an adjustable track element 13 located at one side of the seat, and an adjustable track element 14 located at the other side of the seat. Each track element has a slide 15 embodying a U-shaped supporting portion 16 provided with extending flanges 17 to which plastic blocks 18 are secured when encompassed by inwardly presenting arcuate edge portions 19 of slidable element 21. In the track element 13, the slide 15 has the blocks 18 disposed in vertical aligned relation to each other, while the slide of the track element 14 has the blocks 18 disposed in aligned horizontal relation to each other. The U-shaped supporting portion 16 of the slide 15 of the track member 14 is directly secured to the floor panel 22 of an automotive vehicle body by suitable means, herein illustrated as by bolts 23. The slide 15 of the track element 13, as illustrated in FIGS. 9 and 10, has the supporting portion 16 thereof aligned with and formed from the vertically disposed supporting element 24 which has a horizontal flange 25 at the bottom secured to the floor 22 by the bolts 23.

Referring more specifically to FIGS. 1–7 inclusive, an upwardly presenting channel-shaped member 27 is welded or otherwise secured to the horizontally disposed top face of the slide element 21. A housing 28 containing a worm and worm wheel 29 is secured by screws 31 to opposite sides of the housing of the channel-shaped member 27. The worm and worm wheel drive a lead screw 32 which has a forward end journaled in the housing 28, and the main body supported in nut mechanisms 33 and 34. The nut mechanism 34 has extending arms 35 projecting through apertures 36 in opposite sides of the channel-shaped member 27. The nut mechanism 33, as illustrated in FIG. 5, has projecting fingers 37 extending through slots 38 in the sides of the channel member 27 and through apertures 39 in a U-shaped bracket 41 which is secured to the U-shaped portion 16 of the slide by a rivet 42 as illustrated in FIG. 2. In this manner, the lead screw 32 is retained in substantially horizontal position against a tilting movement.

When a coil 11 of a solenoid 43 of the nut mechanism 33 is energized, a plunger 20 is moved down against the bias of a spring 30 into engagement with a cam slot 40 in a nut 50 which is held against rotation and a driving relation will occur with the lead screw which moves the nut mechanism 33 therealong. Since, however, the nut mechanism is maintained in fixed relationship to the bracket 41, the nut cannot move and the lead screw will thereby be driven lengthwise through the nut to move the entire mechanism and slide horizontally therewith. While the track element 14 has its slide moved in this manner, it is to be understood that the slide of the seat track 13 moves along therewith in view of the torsion bar 44 which interconnects the two seat supporting elements.

When a solenoid 45 of the nut mechanism 34 is energized, the nut is held against rotation and is driven along the lead screw. The studs 35 extend through the slots 36 in the channel member 27, and are secured to links 46 and 47 as clearly illustrated in FIG. 6. The links 46 and 47 are moved horizontally with the nut mechanism 34 when the solenoid 45 thereof is energized, such movement operating a bell crank 48 at the forward end of the track element and a bell crank 49 at the rearward end thereof being connected thereto by pivots 51. The bell cranks are secured by pivots 52 and 53 to the forward and rearward ends, respectively, of the upwardly presented channel member 27. The pivot 52 is a stub shaft having the inner end secured to the torsion bar 44 by a pin 54 to thereby have it rotate with the bell crank 48. The actuated arm 55 of the bell crank is secured by a pivot 56 to a seat supporitng bracket 57. The bell crank arm 58 of the bell crank 49 at the rear end of the track element, is connected by a pivot 59 to the seat supporting element 57. The link 47 on the inner side of the upwardly presented channel-shaped element 27 is connected by an arm 61 to the stub shaft 52 and welded or otherwise secured to the torsion bar 44. A U-shaped bracket 62 is secured by rivets 63 or other means to the inner side of the upwardly presented channel member 27, forming a support for a motor 64 having its shaft joined by a connecting sleeve 65 to a shaft 66 of the worm gear drive, as clearly illustrated in FIG. 3.

As illustrated in FIG. 2, the seat supporting element 57 is in its lowermost position with the nut mechanism 34 in its forwardmost position. When the solenoid 45 is energized and the lead screw is driven in the proper direction by the motor 64 through the worm and worm wheel 29, the nut will be moved to the rear moving the link portion 50 therewith and drawing the forwardly extending portions of the links 46 and 47 to the rear thereby rotating the bell cranks 48 and 49 in a counterclockwise direction. This moves the pivots 56 and 59 substantially vertically on a slight arc to raise the seat supporting element 57 vertically. This movement can continue until the arms 35 reach the end of the slots 36, at which time the seat will be in its uppermost position. Upon the reverse rotation of the motor 64, the worm and worm wheel 29 and the lead screw 32, the nut mechanism 34 will be advanced to the left as viewed in FIG. 2, to thereby rotate the bell cranks 48 and 49 in a clockwise direction lowering the pivots 56 and 59 and thereby lowering the seat supporting element 57. A bracket 67 extends from the inside of the channel-shaped element 27 and is employed for supporting a pair of switches 68 and 69 in position to be engaged by an arm 71 secured to the link 47, as illustrated more clearly in FIG. 1. The switches limit the movement of the mechanism for raising and lowering the seat, being connected in a circuit containing the solenoid 45 in the conventional manner.

The track 13 on the opposite side of the seat from the track 14 has a slide 21 pivotally supporting a bell crank 75 at its forward end on a pivot 76 and a bell crank 77 on a pivot 78 at its rear end. A link 79 interconnects arms 81 and 82 of the bell cranks 75 and 77 to have them operate in unison. An arm 83 of the bell crank 75 is connected by a pivot 84 to a seat supporting element 85. An arm 86 of the bell crank 77 is connected by a pivot 87 to the seat supporting element 85. The seat supporting element 85 is raised and lowered as the bell cranks are operated counterclockwise and clockwise, respectively, due to the interconnecting link 79. The pivot 76 of the bell crank 75 is welded or otherwise secured thereto in fixed relation and is disposed within the torsion bar 44 and secured thereto by a pin 88.

A diagonally extending brace 12 is welded to the side of the upwardly presenting U-shaped channel element 27, as illustrated in FIGS. 1 and 6, with the opposite end secured to a sleeve 89 which extends over the torsion bar 44 adjacent to the track 13, as illustrated in FIGS. 1, 7 and 9, maintained against endwise movement by a pair of pins 91. With this arrangement, the torsion bar directly operates the two forward bell cranks 48 and 75 in unison to cause the seat supporting elements 57 and 85 to move upwardly and downwardly simultaneously.

When the nut mechanism 33 is operated and the nut is maintained stationary by the supporting bracket 41, the movement of the lead screw through the nut not only carries the movable portion of the track 14 therewith, but in view of the torsion bar and the brace 12, will cause the movable parts on the slide 16 of the track 13 to move forwardly and backwardly therewith. This forward and rearward movement is limited by a switch 93 secured by a screw 94 to the base portion of the slide element 16 as illustrated in FIG. 5. The forward position of the movable portion of the track is interrupted when a finger 95 engages the plunger 96 of the switch. A second switch 97 is mounted on the forward upper end of U-shaped element 27, as illustrated in FIGS. 1 and 2, and engaged by the solenoid 43 of the nut mechanism to limit the rearward movement of the movable portion of the track 14. A pin 98 extends through the lead screw at the rear end thereof to prevent the rear nut mechanism 34 from moving from the lead screw and for engaging the nut mechanism and causing the nut portion to turn with the lead screw and to freewheel or rotate relative to its supporting mechanism. This also limits the travel of the nut mechanism rearwardly which thereby limits the upward movement of the seat. A seat frame 99 rests upon the seat supporting elements 57 and 85 and is secured in position thereon by bolts or other suitable means, as is the conventional practice.

The seat frame 99 is raised and lowered when the nut of the nut mechanism 34 is maintained stationary and the mechanism is driven along the lead screw 32 for operating the bell cranks to raise or lower the seat depending upon the direction of rotation of the lead screw 32. Similarly, the energization of the solenoid of the nut mechanism 33 retains the nut against rotation, and since it is supported on the channel element 27, the lead screw will advance through the nut forwardly or rearwardly depending upon the direction of rotation of the lead screw to carry the entire seat supporting structure of both tracks forwardly or rearwardly therewith. The slides for supporting the mechanism are of the same construction, with the slide on the track 14 disposed horizontally while the slide on the track 13 is disposed in a vertical position. A drive is provided between the slides of the two tracks by the rotatable torsion bar 44 and the diagonally disposed brace connected to a sleeve disposed thereon. The arrangement is such as to cause both sides of the seat to be moved horizontally or vertically while maintained in aligned relationship.

What is claimed is:

1. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, and blocks of low friction material within the channel portions locked to the edges of the spaced aligned flanges.

2. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, blocks of low friction material within the channel portions locked to the edges of the spaced aligned flanges, an upwardly facing channel element on the horizontally disposed slide, a bell crank pivoted to the front of said element, a bell crank pivoted to the rear of said element, said bell cranks having a pair of arms, drive means within said channel element comprising a lead screw and a pair of solenoid operated nuts thereon, and link means connecting one of said nuts to an arm of each bell crank for swinging the bell crank in a clockwise or counterclockwise direction depending upon the direction of rotation of the lead screw.

3. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, blocks of low friction material within the channel portions locked to the edges of the spaced aligned flanges, an upwardly facing channel element on the horizontally disposed slide, a bell crank pivoted to the front of said element, a bell crank pivoted to the rear of said element, said bell cranks having a pair of arms, drive means within said channel element comprising a lead screw and a pair of solenoid operated nuts thereon, link means connecting one of said nuts to an arm of each bell crank for swinging the bell crank in a clockwise or counterclockwise direction depending upon the direction of rotation of the lead screw, and a seat supporting element pivoted to the other arm of said bell cranks to be raised and lowered thereby.

4. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, blocks of low friction material within the channel portions locked to the edges of the spaced aligned flanges, an upwardly facing channel element on the horizontally disposed slide, a bell crank pivoted to the front of said element, a bell crank pivoted to the rear of said element, said bell cranks having a pair of arms, drive means within said channel element comprising a lead screw and a pair of solenoid operated nuts thereon, link means connecting one of said nuts to an arm of each bell crank for swinging the bell crank in a clockwise or counterclockwise direction depending upon the direction of rotation of the lead screw, a seat supporting element pivoted to the other arm of said bell cranks to be raised and lowered thereby, and a bracket fixed to the base to which the second nut mechanism is secured to cause the lead screw to drive therethrough when the nut is secured against rotation to move the slide forwardly and rearwardly therewith.

5. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, blocks of low friction material within the channel portions locked to the edges of the spaced aligned flanges, an upwardly facing channel element on the horizontally disposed slide, a bell crank pivoted to the front of said element, a bell crank pivoted to the rear of said element, said bell cranks having a pair of arms, drive means within said channel element comprising a lead screw and a pair of solenoid operated nuts thereon, link means connecting one of said nuts to an arm of each bell crank for swinging the bell crank in a clockwise or counterclockwise direction depending upon the direction of rotation of the lead screw, a seat supporting element pivoted to the other arm of said bell cranks to be raised and lowered thereby, bell cranks pivoted directly to opposite ends of the vertically disposed slide of the spaced track, a torsion bar interconnecting the pivots of the forwardly pivoted bell cranks of the spaced tracks, a seat supporting element pivoted to one arm of the bell cranks on the vertically disposed slide, and a link joining the other arms of said last bell cranks for moving the last seat supporting element upwardly and downwardly with the first said seat supporting element.

6. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, blocks of low friction material within the channel portions locked to the edges of the spaced aligned flanges, an upwardly facing channel element on the horizontally disposed slide, a bell crank pivoted to the front of said element, a bell crank pivoted to the rear of said element, said bell cranks having a pair of arms, drive means within said channel element comprising a lead screw and a pair of solenoid operated nuts thereon, link means connecting one of said nuts to an arm of each bell crank for swinging the bell crank in a clockwise or counterclockwise direction depending upon the direction of rotation of the lead screw, a seat supporting element pivoted to the other arm of said bell cranks to be raised and lowered thereby, bell cranks pivoted directly to opposite ends of the vertically disposed slide of the spaced track, a torsion bar interconnecting the pivots of the forwardly pivoted bell cranks of the spaced tracks, a seat supporting element pivoted to one arm of the bell cranks on the vertically disposed slide, a link joining the other arms of said last bell cranks for moving the last seat supporting element upwardly and downwardly with the first said seat supporting element, and a diagonal brace extending from said channel-shaped element on the horizontally disposed slide to a sleeve on said torsion bar.

7. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, blocks of low friction material within the channel portions locked to the edges of the spaced aligned flanges, an upwardly facing channel element on the horizontally disposed slide, a bell crank pivoted to the front of said element, a bell crank pivoted to the rear of said element, said bell cranks having a pair of arms, drive means within said channel element comprising a lead screw and a pair of solenoid operated nuts thereon, link means connecting one of said nuts to an arm of each bell crank for swinging the bell crank in a clockwise or counterclockwise direction depending upon the direction of rotation of the lead screw, a seat supporting element pivoted to the other arm of said bell cranks to be raised and lowered thereby, bell cranks pivoted directly to opposite ends of the vertically disposed slide of the spaced track, a torsion bar interconnecting the pivots of the forwardly pivoted bell cranks of the spaced tracks, a seat supporting element pivoted to one arm of the bell cranks on the vertically disposed slide, a link joining the other arms of said last bell cranks for moving the last seat supporting element upwardly and downwardly with the first said seat supporting element, a diagonal brace extending from said channel-shaped element on the horizontally disposed slide to a sleeve on said torsion bar, and stop means carried by said torsion bar on each side of said sleeve which prevents endwise movement of the sleeve relative to the torsion bar.

8. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, blocks of low friction material within the channel portions locked to the edges of the spaced aligned flanges, an upwardly facing channel element on the horizontally disposed slide, a bell crank pivoted to the front of said element, a bell crank pivoted to the rear of said element, said bell cranks having a pair of arms, drive means within said channel element comprising a lead screw and a pair of solenoid operated nuts thereon, link means connecting one of said nuts to an arm of each bell crank for swinging the bell crank in a clockwise or counterclockwise direction depending upon the direction of rotation of the lead screw, a seat supporting element pivoted to the other arm of said bell cranks to be raised and lowered thereby, bell cranks pivoted directly to opposite ends of the vertically disposed slide of the spaced track, a torsion bar interconnecting the pivots of the forwardly pivoted bell cranks of the spaced tracks, a seat supporting element pivoted to one arm of the bell cranks on the vertically disposed slide, a link joining the other arms of said last bell cranks for moving the last seat supporting element upwardly and downwardly with the first said seat supporting element, a diagonal brace extending from said channel-shaped element on the horizontally disposed slide to a sleeve on said torsion bar, stop means carried by said torsion bar on each side of said sleeve which prevents endwise movement of the sleeve relative to the torsion bar, a pair of switches for limiting the forward and rearward movement of said seat supporting mechanism, and a pair of switches for limiting the upward and downward movement of said seat supporting elements.

9. In a seat supporting mechanism, a pair of spaced tracks having slide means thereon supporting pivoted bell cranks for raising and lowering a seat, a rotatable torsion bar interconnecting the bell cranks at the forward end of said tracks, and a diagonal brace on one of said slide means connected to a relatively rotatable element on the end of the torsion bar adjacent to the slide means of the other track for providing stability and rigidity to the slide means of the two track elements.

10. In a seat supporting mechanism, a pair of spaced tracks having slide means thereon supporting pivoted bell cranks for raising and lowering a seat, a rotatable torsion bar interconnecting the bell cranks at the forward end of said tracks, a diagonal brace on one of said slide means connected to a relatively rotatable element on the end of the torsion bar adjacent to the slide means of the other track for providing stability and rigidity to the slide means of the two track elements, and pairs of switch means for limiting the horizontal movement of the slide means and for limiting the extent of vertical movement of the seat.

11. In a seat supporting mechanism, spaced track members, a slide member on each track member, each slide member being composed of a fixed element having a web portion and laterally extending flanges which are in a horizontal plane on one track member and in a vertical plane on the other track member to provide vertical and horizontal stability to the mechanism, slide elements on said fixed elements embodying a web and reversely rolled edges, and blocks secured to the edges of the flanges by the rolled edges when slid thereover.

12. In a seat supporting mechanism, spaced track members, a slide member on each track member, each slide member being composed of a fixed element having a web portion and laterally extending flanges which are in a horizontal plane on one track member and in a vetrical plane on the other track member to provide vertical and horizontal stability to the mechanism, slide elements on said fixed elements embodying a web and reversely rolled edges, blocks secured to the edges of the flanges by the rolled edges when slid thereover, seat supporting elements and bell crank means on said slide members, and seat supporting elements on said bell cranks for raising and lowering said seat supporting mechanisms when rotated.

13. In a seat supporting mechanism, spaced track members, a slide member on each track member, each slide member being composed of a fixed element having a web portion and laterally extending flanges which are in a horizontal plane on one track member and in a vertical plane on the other track member to provide vertical and horizontal stability to the mechanism, slide elements on said fixed elements embodying a web and reversely rolled edges, blocks secured to the edges of the flanges by the rolled edges when slid thereover, seat supporting elements and bell crank means on said slide members, seat supporting elements on said bell cranks for raising and lowering said seat supporting mechanisms when rotated, a motor driven lead screw on the horizontally disposed slide having a pair of solenoid operated nut mechanisms thereon, and means interconnecting one of said nut mechanisms to said bell cranks.

14. In a seat supporting mechanism, spaced track members, a slide member on each track member, each slide member being composed of a fixed element having a web portion and laterally extending flanges which are in a horizontal plane on one track member and in a vetrical plane on the other track member to provide vertical and horizontal stability to the mechanism, slide elements on said fixed elements embodying a web and reversely rolled edges, blocks secured to the edges of the flanges by the rolled edges when slid thereover, seat supporting elements and bell crank means on said slide members, seat supporting elements on said bell cranks for raising and lowering said seat supporting mechanisms when rotated, a motor driven lead screw on the horizontally disposed slide having a pair of solenoid operated nut mechanisms thereon, means interconnecting one of said nut mechanisms to said bell cranks, and means connecting said other nut mechanism to a fixed support for causing the lead screw to move through the nut thereof when held stationary for producing fore and aft movement to the seat supporting elements.

15. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, blocks of low friction material within the channel portions locked to the edges of the spaced aligned flanges, and a bar interconnecting said movable portions and secured thereon for rotational movement.

16. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, blocks of low friction material within the channel portions locked to the edges of the spaced aligned flanges, a bar interconnecting said movable portions and secured thereon for rotational movement, and a bracing member interconnecting said movable portions in addition to said bar.

17. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, blocks of low friction material within the channel portions locked to the edges of the spaced aligned flanges, a bar interconnecting said movable portions and secured thereon for rotational movement, a bracing member interconnecting said movable portions in addition to said bar, one end of said bracing member being rigidly connected to an end of one movable portion, and a sleeve on said bar to which the other end of the bracing member is secured.

18. In a seat supporting structure, a pair of spaced supporting tracks embodying a pair of slides each having a fixed and movable portion with the fixed portion having a floor engaging portion and spaced aligned extending flanges, said flanges being disposed horizontally on the fixed portion of one slide and vertically on the fixed portion of the other slide to provide vertical and horizontal stability to the structure, said movable portion having a web portion and channel portions presenting toward each other, blocks of low friction material within the channel portions locked to the edges of the spaced aligned flanges, a bar interconnecting said movable portions and secured thereon for rotational movement, a bracing member interconnecting said movable portions in addition to said bar, one end of said bracing member being rigidly connected to an end of one movable portion, a sleeve on said bar to which the other end of the bracing member is secured, and means on said bar preventing the axial movement of the sleeve thereon.

19. In a seat supporting structure, a pair of spaced supporting tracks embodying a pair of slides each having a fixed and movable portion, a bar interconnecting said movable portions and secured thereon for rotational movement, and a diagonally disposed bracing member stabilizing said movable portions in addition to said bar, one end of said bracing member being rigidly connected adjacent to an end of one movable portion.

20. In a seat supporting structure, a pair of spaced supporting tracks embodying a pair of slides each having a fixed and movable portion, a bar interconnecting said movable portions and secured thereon for rotational movement, a bracing member stabilizing said movable portions in addition to said bar, one end of said bracing member being rigidly connected adjacent to an end of one movable portion, and a sleeve on said bar to which the other end of the bracing member is secured.

References Cited in the file of this patent

UNITED STATES PATENTS

| | | |
|---|---|---|
| 2,684,108 | Rappl | July 20, 1954 |
| 2,809,688 | Brundage | Oct. 15, 1957 |
| 2,840,425 | Howell | June 24, 1958 |
| 2,921,621 | Williams | Jan. 19, 1960 |
| 2,929,438 | Homier | Mar. 22, 1960 |